US006990409B2

(12) United States Patent
Khan et al.

(10) Patent No.: US 6,990,409 B2
(45) Date of Patent: *Jan. 24, 2006

(54) METHOD AND SYSTEM USING DELIVERY TRUCKS TO COLLECT ADDRESS LOCATION DATA

(75) Inventors: M. Salahuddin Khan, Lake Forest, IL (US); Narayanan Alwar, Bloomingdale, IL (US)

(73) Assignee: Navteq North America, LLC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/980,644

(22) Filed: Nov. 3, 2004

(65) Prior Publication Data

US 2005/0065719 A1 Mar. 24, 2005

Related U.S. Application Data

(63) Continuation of application No. 10/094,081, filed on Mar. 8, 2002, now Pat. No. 6,816,784.

(51) Int. Cl.
*G01C 21/00* (2006.01)
*G01S 5/04* (2006.01)
*G06F 7/00* (2006.01)

(52) U.S. Cl. ........................ 701/204; 701/209; 455/426

(58) Field of Classification Search ................ 701/204, 701/209, 213, 214, 25, 117, 208; 340/988, 340/995; 342/357.07, 357.13, 457; 455/426, 455/456, 457, 466, 553, 556, 557
See application file for complete search history.

(56) References Cited

U.S. PATENT DOCUMENTS 5,043,908 A 8/1991 Manduley et al. .......... 364/478
5,539,645 A 7/1996 Mandhyan et al. .......... 364/438
5,699,056 A 12/1997 Yoshida ...................... 340/905
6,026,345 A 2/2000 Shah et al. ................. 701/117
6,047,234 A 4/2000 Cherveny et al. ........... 701/200
6,154,658 A 11/2000 Caci .......................... 455/466
6,232,915 B1 5/2001 Dean et al. ............ 342/357.07
6,246,882 B1 6/2001 Lachance .................... 455/456
6,255,989 B1 7/2001 Munson et al. ........ 342/357.13
6,266,612 B1 7/2001 Dussell et al. .............. 701/207
6,339,745 B1 1/2002 Novik ........................ 701/208
6,470,268 B1 10/2002 Ashcraft et al. ............ 701/209
6,539,360 B1 3/2003 Kadaba ....................... 705/28
2002/0077750 A1 6/2002 McDonald, Jr. et al. .... 701/213
2002/0169544 A1 11/2002 Hashida ...................... 701/207

FOREIGN PATENT DOCUMENTS

EP 0 782 118 A1 7/1997
EP 1202234 A1 5/2002
WO WO 01/22281 A1 3/2001

*Primary Examiner*—Thomas G. Black
*Assistant Examiner*—Dalena Tran
(74) *Attorney, Agent, or Firm*—Frank J. Kozak; Jon D. Shutter; Lawrence M. Kaplan

(57) ABSTRACT

A system and method are disclosed for collecting data that relate addresses to map-referenced locations. A fleet of delivery trucks delivers items to locations throughout a geographic region. Each item to be delivered includes a tracking code. An electronic code reader device is used to record the tracking code of an item when the item is being delivered. A position determining device, such as a GPS unit, is used to determine a geographic position associated with the delivery of each item. Data indicating the tracking code of an item and the corresponding geographic position associated with the delivery are stored. Then, using data that indicate an address associated with each tracking code, each address is associated with a geographic position. This information is used to revise a geographic database, e.g., to relate addresses to map-referenced locations.

20 Claims, 10 Drawing Sheets

METHOD AND SYSTEM USING DELIVERY TRUCKS TO COLLECT ADDRESS LOCATION DATA

REFERENCE TO RELATED APPLICATIONS

The present application is a continuation of Ser. No. 10/094,081, filed Mar. 8, 2002, now U.S. Pat. No. 6,816,784, the entire disclosure of which is incorporated herein by reference.

BACKGROUND OF THE INVENTION

The present invention relates to collecting geographic data and more particularly, the present invention relates to a process and system that collects address location information using delivery trucks.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

One method for collecting data for a geographic database is described in U.S. Pat. No. 6,047,234. According to one embodiment described in U.S. Pat. No. 6,047,234, navigation systems are installed in a plurality of vehicles that are operated for various purposes. As an example, the vehicles may be used by persons for routine, everyday activities, such as commuting, shopping, and so on. These vehicles are also used passively as probes to collect geographic data as the vehicles are driven for these various other purposes. The navigation systems in these vehicles may also provide navigation-related features to the drivers and/or passengers of the vehicles in which they are installed, or alternatively, the navigation systems may serve only to collect geographic data as the vehicles in which they are installed are driven. The geographic data collected by the plurality of vehicles are gathered together, analyzed, and used to update or refine a master geographic database. Copies of the master geographic database, or database products derived from the master copy, can then be distributed back to the navigation systems installed in the plurality of vehicles.

The embodiments described in U.S. Pat. No. 6,047,234 afford useful advantages. However, there still exists a need to provide improved methods and systems for collecting data for a geographic database.

One type of information that is useful to include in a geographic database is street address location information. Street addresses are not assigned consistently throughout a region or country. Therefore, prior methods for collecting street address location information have required field personnel from a geographic database developer to travel along each street in a geographic region, observe the actual street addresses, record their observations and then add the street address information to the geographic database. This process is relatively time-consuming and therefore relatively expensive.

Accordingly, it would be beneficial to collect street address location information more efficiently.

SUMMARY OF THE INVENTION

To address these and other objectives, the present invention comprises embodiments for collecting data that relate addresses to map-referenced locations. A fleet of delivery trucks delivers items to locations throughout a geographic region. Each item to be delivered includes a tracking code. An electronic code reader device is used to record the tracking code of an item when the item is being delivered. A position determining device, such as a GPS unit, is used to determine a geographic position associated with the delivery of each item. Data indicating the tracking code of an item and the corresponding geographic position associated with the delivery are stored. Then, using data that indicate an address associated with each tracking code, each address is associated with a geographic position. This information is used to revise a geographic database, e.g., to relate addresses to map-referenced locations.

DETAILED DESCRIPTION OF THE PRESENTLY PREFERRED EMBODIMENTS

An important type of information to collect for a geographic database is address location information (also referred to herein as "street address location information"). Address location information relates address information to location information. "Address information" refers to the designation commonly used by people to identify the physical location of a place, such as a building, in a geographic area. Address information includes numbered street addresses, such as "1447 Main Street, Springfield, Mo." Address information also includes named places, such as "One Magnificent Mile", "City Hall in Chicago", "Yankee Stadium", etc. "Location information" refers to a map-referenced designation of a place. A map-referenced designation of a place may include the geographic coordinates of the place. There are other types of map-referenced designations of places.

I. First Embodiment

Figure 1:
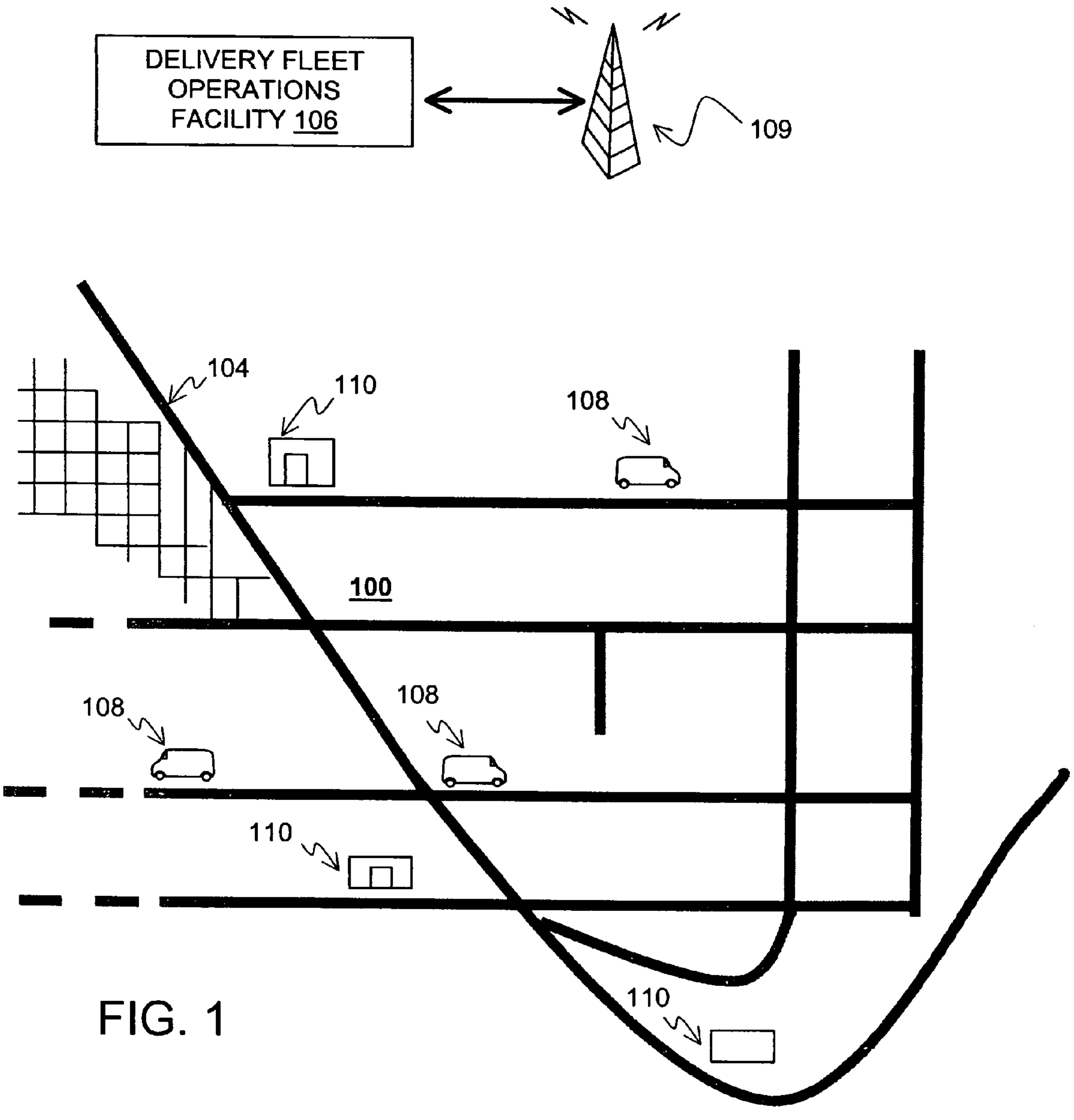
FIG. 1 is an illustration of a geographic area in which an embodiment of the data collection system is used to collect address location data.

Referring to FIG. 1, there is an illustration of a geographic area 100. Located in the geographic area 100 is a road network 104. A fleet of delivery trucks 108 travels on the road network 104 to deliver items to buildings 110 located in the geographic area 100. The items may include packages, letters, or other goods. A delivery fleet operations facility 106 uses a wireless communications system 109 to exchange data with each delivery truck 108.

Each item to be delivered by the delivery trucks 108 is directly or indirectly associated with an address to which the item is to be delivered. The address associated with an item refers to a physical location in the geographic area 100. An address may be a street address. An address may also be a named location, such as "City Hall," "Empire State Building," "One Magnificent Mile," etc.

Figure 2:
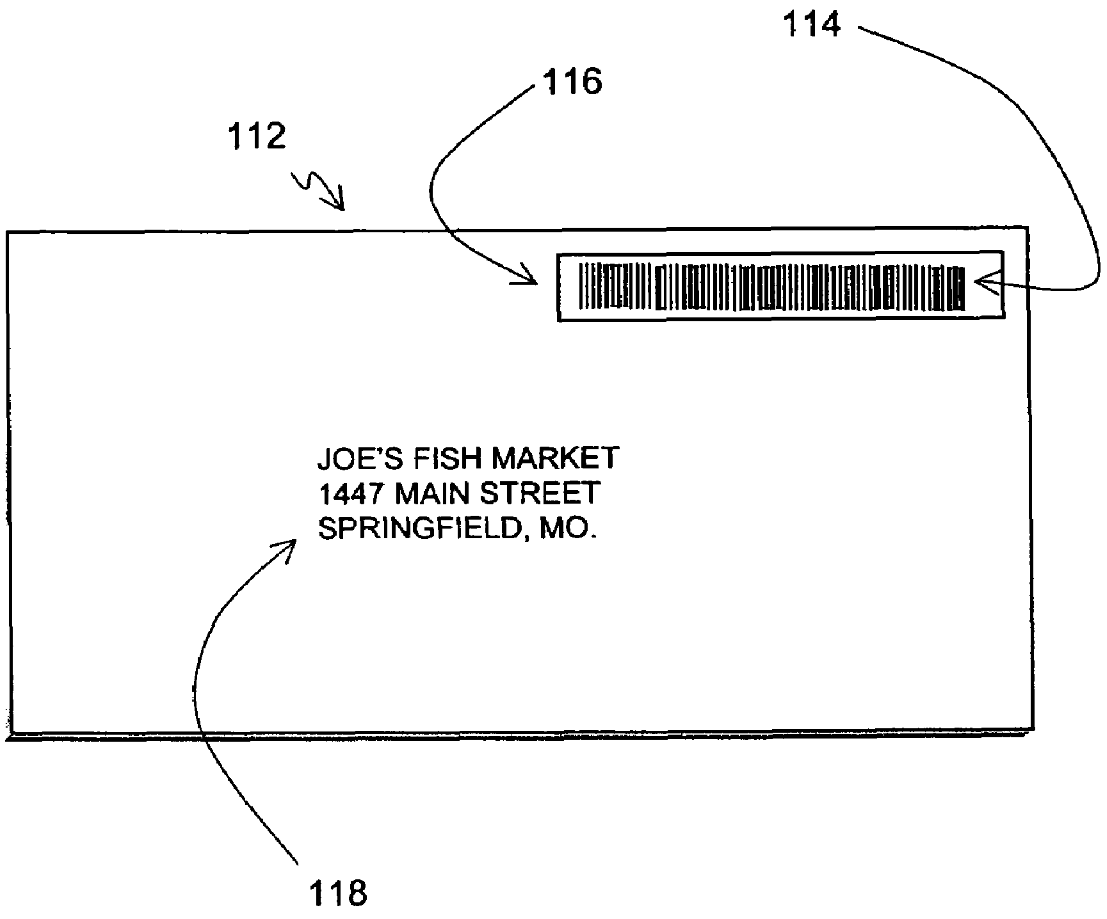
FIG. 2 is an illustration of an item to be delivered by one of the delivery trucks shown in FIG. 1.

FIG. 2 shows an example of a delivery item 112. The delivery item 112 is one of the items to be delivered by the delivery trucks 108 in FIG. 1. In this embodiment, each item to be delivered by one of the delivery trucks 108 is associated with a tracking code 114. In one embodiment, the tracking code 114 is a number, alphanumeric string, or other indicia that identifies the item. In one embodiment, the tracking code 114 uniquely identifies the items. As shown in FIG. 2, a label 116 includes a copy of the tracking code 114 and is applied or affixed to the item 112. In the embodiment of FIG. 2, the tracking code 114 applied to the item is in a machine-readable format. For example, the tracking code 114 may be applied to the item as a bar code; however, any other machine-readable format may be suitable, including printed alphanumeric characters. As shown in FIG. 2, a delivery address 118 is also applied to the item 112. The delivery address 118 refers to the street address located along one of the roads that form the road network 104 to which the item 112 is to be delivered.

Figure 3:
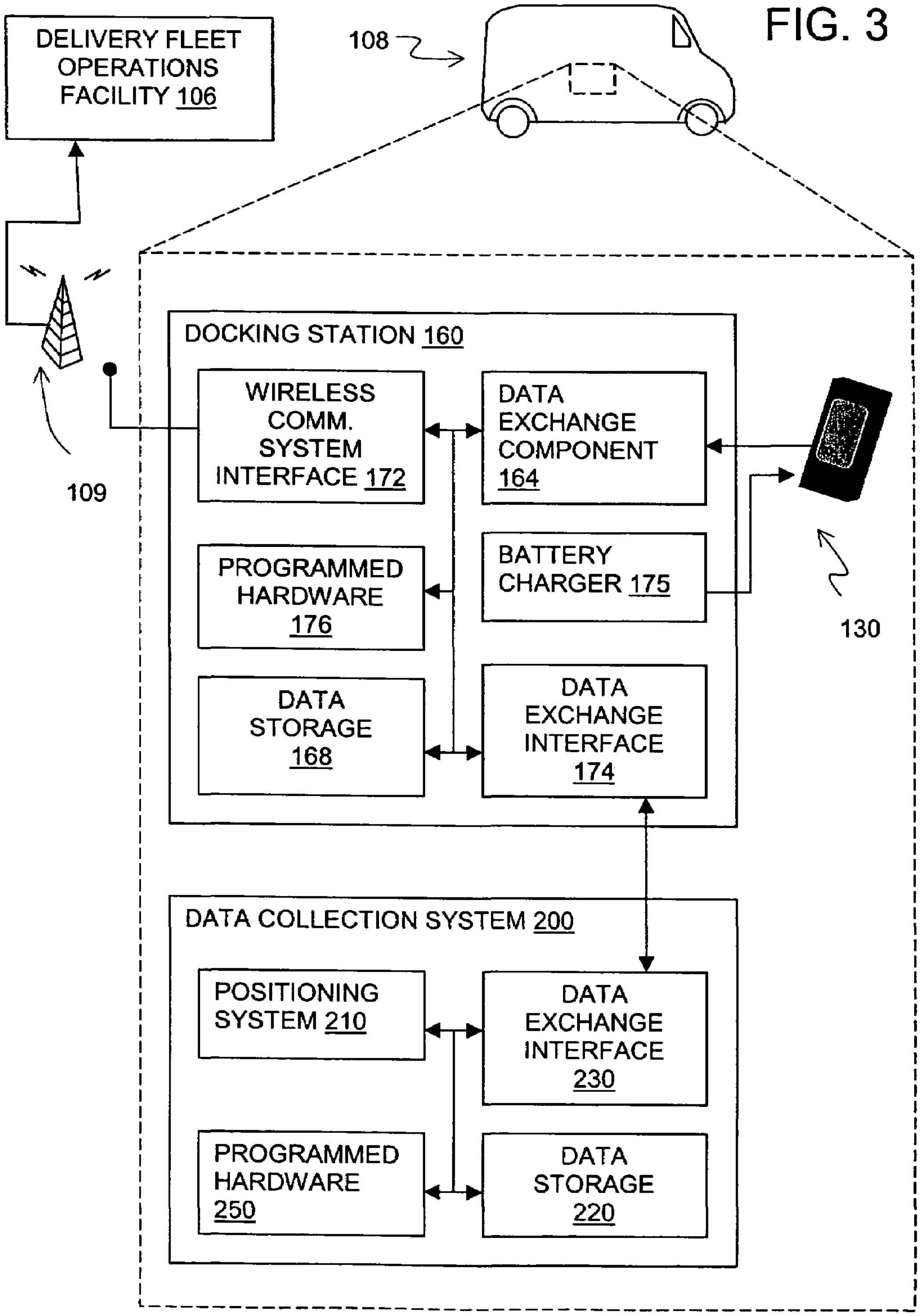
FIG. 3 is a block diagram showing components in one of the delivery trucks shown in FIG. 1.

FIG. 3 shows components of one of the delivery trucks 108. Associated with each delivery truck 108 is a code reader 130. The code reader 130 is a hand-held, portable device that can be removed from the delivery truck and carried from the delivery truck by the delivery truck operator. The code reader 130 includes hardware and software capable of reading the tracking codes 114 on items being delivered. The hardware and software in the code reader 130 is also capable of storing internally data that associate a delivery attempt result with a tracking code.

Figure 4:
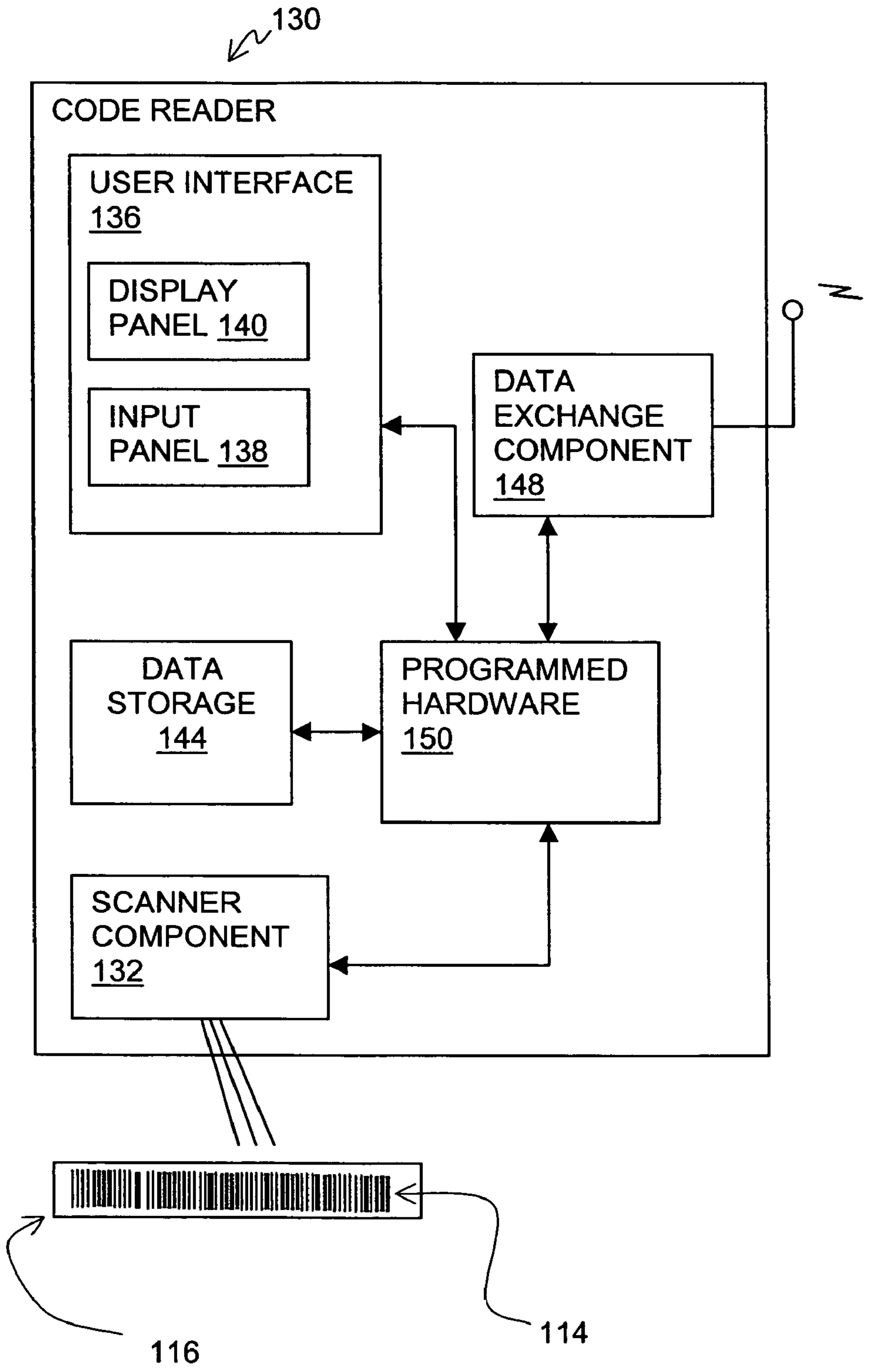
FIG. 4 is a block diagram showing components of the code reader shown in FIG. 3.

FIG. 4 shows some of the components of the code reader 130. The code reader 130 includes a scanner component 132. The scanner component 132 is capable of reading the tracking code 114 on a label of a delivery item. If the tracking code is a bar code, the scanner component 132 includes a bar code reader. The code reader 130 also includes a user interface 136. The user interface 136 of the code reader 130 includes an input panel 138, such as a keypad, and a display screen 140. The user interface 136 of the code reader provides a means by which the delivery truck operator can enter information that indicates a delivery attempt result.

The code reader 130 also includes a data storage medium 144. The data storage medium 144 may be removable or replaceable from the code reader or alternatively, the data storage medium 144 may be non-removable. Hardware and programming in the code reader 130 provides for storing data in the data storage medium 144. More specifically, the code reader 130 provides for storing data on the storage medium 144 by which a delivery attempt result (entered by the delivery truck operator using the user interface 136) can be associated with a tracking code read from an item by the scanner component 132.

In the embodiment of FIG. 4, the code reader 130 includes a data exchange component 148. The data exchange component 148 interfaces with the hardware and software in the code reader 130. In one embodiment, the data exchange component 148 is a communications port. The data exchange component 148 incorporates any suitable technology or specification for exchanging data with an external unit. The data exchange component 148 provides for transmitting data that have been stored in the data storage medium 144 from the code reader 130 to another device, as explained in more detail below.

The code reader 130 includes additional hardware and software 150 that provide and support the functions described above. This additional hardware and software 150 include processors, circuits, memory, programming and so on. The design and construction of this hardware and software are known to those of skill in the art.

The code reader 130 includes an energy source (not shown), such as a battery. The energy source provides power for the components of the code reader 130. The energy source may be rechargeable and accordingly a recharger may be located in the delivery truck for this purpose.

Referring again to FIG. 3, located in the delivery truck 108 is a docking station 160. The docking station 160 is a combination of hardware and software components.

The docking station 160 includes a data exchange component 164. The data exchange component 164 of the docking station 160 is compatible with the data exchange component 148 of the code reader 130 so that the code reader 130 can transfer data to the docking station 160.

The docking station 160 includes a data storage medium 168. The data storage medium 168 in the docking station 160 is capable of storing, at least for a short period of time, data received from the code reader 130. The data storage medium 168 in the docking station 160 may be removable or non-removable. For example, a flash card, PCMCIA card, or a hard drive may be used as the data storage medium in the docking station 160. Other types of data storage media are also suitable.

The docking station 160 also includes a long-range wireless communications system interface 172. The long-range wireless communications system interface 172 is compatible with the wireless communications system 109 (in FIG. 1) and is capable of exchanging data with the remotely located delivery operations facility 106. The wireless communications system 109 may use any suitable technology, such as cellular, PCS, etc., for exchanging data wirelessly between the delivery truck 108 and the delivery fleet operations facility 106.

The docking station 160 includes a data exchange interface 174. The data exchange interface 174 is capable of exchanging data, including data stored in the data storage medium 168, with another device having a compatible data exchange interface, as explained further below.

The docking station 160 also includes its own power source, such as a battery (not shown), or alternatively, the docking station obtains energy from the delivery truck.

The docking station 160 also includes battery charger 175. The battery charger can be coupled to the code reader 130 in order to charge the battery in the code reader 130.

The docking station 160 includes additional hardware and software 176 that provide and support the functions described above. This additional hardware and software 176 include processors, circuits, memory, programming and so on. The design and construction of this hardware and software are known to those of skill in the art.

Located in the delivery truck 108 is a position data collection system 200. The position data collection system 200 is a combination of hardware and software components. The position data collection system 200 includes a position determining component 210. The position determining component 210 is capable of determining its own geographic location, and hence, the geographic location of the delivery truck 108 in which it is installed. The position determining component 210 determines the geographic location of the delivery truck at discrete times or continuously as the delivery truck travels along the road network 104 making deliveries in the geographic area 100. The position determining component 210 may use GPS technology and/or other equipment, by which the location of the delivery truck 108 can be determined.

The data collection system 200 includes a data storage medium 220. The data storage medium 220 is a non-volatile memory device capable of storing data for up to several days at a time. In one embodiment, the data storage medium 220 is a flash memory card, such as a SanDisk® memory card having a storage capacity of 64 megabytes. Other types of data storage devices, as well as data storage devices having other capacities, may also be suitable.

The data collection system 220 includes a data exchange interface 230. The data exchange interface 230 is compatible with a corresponding data exchange interface 174 in the docking station 160. In one embodiment, the data exchange interfaces 174 and 230 use a direct cable connection, although in alternative embodiments a short-range wireless connection may be used.

The data collection system 200 includes additional hardware and software 250 that provide and support the functions described above. This additional hardware and software 250 include processors, circuits, memory, programming and so on. The design and construction of this hardware and software are known to those of skill in the art.

II. Operation of First Embodiment

The data collection system 200 in FIG. 3 is used to collect address location information. Address location information relates named addresses (e.g., "1447 Main Street, Springfield, Mo.", "One Magnificent Mile", "City Hall in Chicago", etc.) to geographic coordinates. Prior methods for collecting address location information are relatively expensive. The data collection system 200 in FIG. 3 can be operated to collect address location information efficiently and relatively inexpensively.

As stated above, the delivery trucks 108 are driven on the road network 104 to deliver the items 112 to locations throughout the geographic region 100. Based on various factors, the delivery fleet operations facility 106 determines which items to load in each truck and also determines the route that each truck follows in order to deliver the items efficiently.

Figure 5:
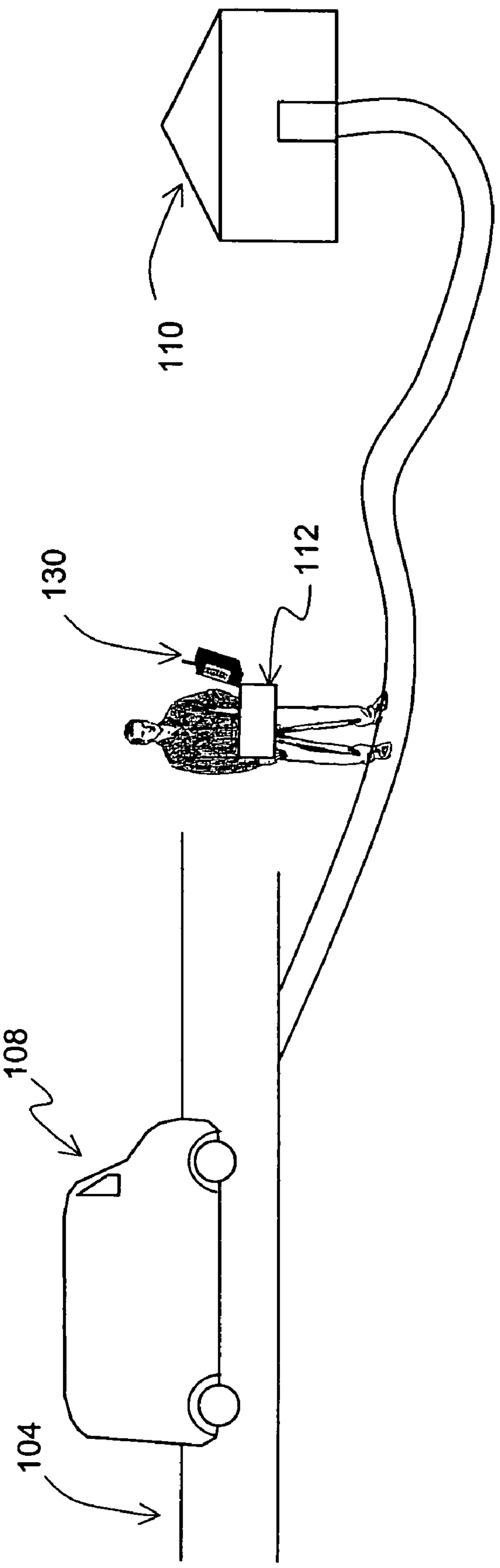
FIG. 5 is an illustration showing an attempt to make a delivery in accordance with the embodiment of FIGS. 1–4.
Figure 6:
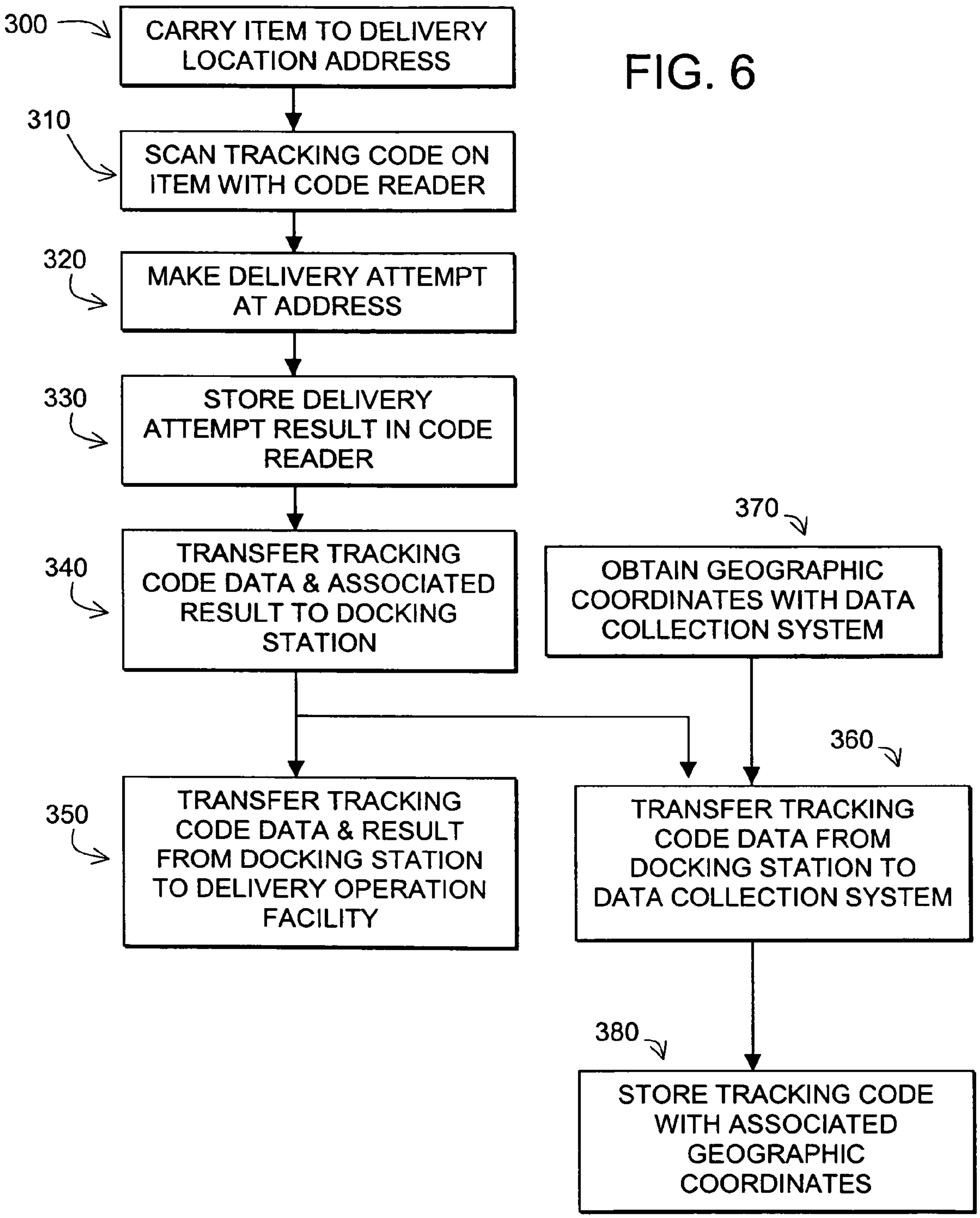
FIG. 6 is a flowchart showing steps in a process for collecting address location data using the embodiment of FIGS. 1–5.

A process performed using the data collection system to collect address location data is described in connection with FIGS. 5–7. Referring to FIG. 5, when delivering an item, the delivery truck operator drives the truck to the location corresponding to the address associated with the item. The delivery truck driver may obtain the address from the label on the item. Alternatively, the delivery truck driver may be guided to the address to which the item is to be delivered by a navigation system associated with the delivery truck into which the address associated the item has been input. According to another alternative, the delivery fleet operations facility 106 may determine a route for the delivery truck and provide a map or other instructions indicating the locations at which deliveries are to be made by the delivery truck driver.

In order to make deliveries efficiently, the delivery truck driver attempts to drive the delivery truck as close as possible to the location to which the delivery is to be made, while complying with applicable parking and traffic restrictions. As shown in FIG. 5, after the delivery truck driver drives as close as possible to the location to which the delivery is to be made, the delivery truck driver (or another person who accompanies the delivery truck operator) carries the item 112 to be delivered from the delivery truck 108 to the building 110 associated with the address on the item (Step 300 in FIG. 6). The delivery truck driver (or the other person who accompanies the driver) may still have to walk some distance (e.g., along a sidewalk or through an office corridor) to reach the actual place where the delivery is to be made.

There are different conditions under which the item can be delivered. Some of these different conditions include the following:

A person to whom the item is addressed is required to physically receive the item.

A person to whom the item is addressed is required to physically receive the item and sign for the item.

Any person at the building can receive the item.

The item may be left at the building.

When an item is being delivered, a delivery condition is associated with the item. The type of condition associated with an item is specified in a delivery instruction. The delivery truck operator is informed of the delivery instruction associated with an item. The delivery truck operator may be informed of the delivery instruction from a label applied to the item, from documentation provided with the item, or other means. The delivery truck operator attempts to deliver the item in accordance with the delivery condition. Thus, if the delivery condition for an item indicates that it can be left at the building, the delivery truck operator leaves the item at the building. However, if the delivery condition for an item calls for hand delivery to a specific person, the deliver truck operator attempts to find the person to whom the item is to be delivered. If the delivery condition calls for hand delivery to a person and the person is not available, the delivery truck operator returns the item to the delivery truck. An attempted delivery notice may be left at the location.

For at least some delivery conditions, the delivery truck operator records data that indicate the outcome of an attempt to deliver the item. For example, the delivery truck operator may record data that indicate the outcome of a delivery attempt if the delivery condition requires that an item be accepted by a person at the delivery address or that a specific person accept delivery. When the delivery truck operator carries the item from the delivery truck to the building at which the delivery is to be made, the delivery truck operator uses the code reader 130 to scan the tracking code label 116 on the item to be delivered (Step 310 in FIG. 6). When the tracking code label 116 on the item to be delivered is scanned, the tracking code 114 is stored in the memory 144 of the code reader 130. After the delivery or attempted delivery (Step 320), the delivery truck operator uses the code reader 130 to record a delivery attempt result (Step 330). The input panel 138 of the code reader 130 is used for this purpose. The input panel 138 of the code reader 130 may be designed to facilitate efficient, error-free entry of the delivery attempt result. Specific keys on the input panel 138 may be dedicated to certain results so that the delivery truck operator may need to press only one key to record a result. The delivery attempt result indicates the outcome of the delivery attempt. Delivery attempt results include 'LEFT ITEM WITH ADDRESSEE', 'LEFT ITEM WITH PERSON AT DELIVERY ADDRESS', and 'RETURNED ITEM TO TRUCK.' There may be other delivery attempt results in addition to these. When the delivery truck operator uses the code reader 130 to record the delivery attempt result, the data indicating the delivery attempt result are associated with the data indicating the tracking code associated with the item being delivered.

After the delivery attempt, the delivery truck operator returns to the delivery truck 108. When the delivery truck operator returns to the delivery truck 108, the data indicating the tracking code and the associated data indicating the delivery attempt result are transferred from the code reader 130 to the docking station 160 (Step 340). In this embodiment, the deliver truck operator physically places the code reader 130 in a cradle (or similar component) in the docking station 160. When the code reader 130 is mounted in the docking station 160, the data are transferred from the code reader 130 to the docking station 160 through a direct electrical connection provided in the cradle. The transfer of data may occur automatically as soon as the code reader 130 is mounted in the docking station 160. Alternatively, the delivery truck operator may initiate the transfer of data by appropriate manipulation of the user interface of either the code reader or docking station. The transfer of data from the code reader 130 to the docking station 160 may occur while the code reader is being recharged.

After the data indicating the tracking code and the associated data indicating the delivery attempt result have been transferred from the code reader 130 to the docking station 160, the docking station may transfer the data indicating the tracking code and the associated data indicating the delivery attempt result to the delivery fleet operations facility 106 using the wireless communications system 109 (Step 350).

After the data indicating the tracking code and the associated data indicating the delivery attempt result have been transferred from the code reader 130 to the docking station 160, the docking station 160 transfers the data indicating the tracking code to the data collection system 200 (Step 360). In the data collection system 200, the geographic coordinates of the delivery truck have been obtained (Step 370). In the data collection system 200, the tracking code is associated with the data indicating the geographic coordinates of the delivery truck and stored on the data storage medium in the data collection system 200 (Step 380).

The delivery truck operator resumes making deliveries by proceeding to deliver the next item. The process shown in FIG. 6 is repeated for the delivery of each item delivered by the delivery truck.

Figure 7:
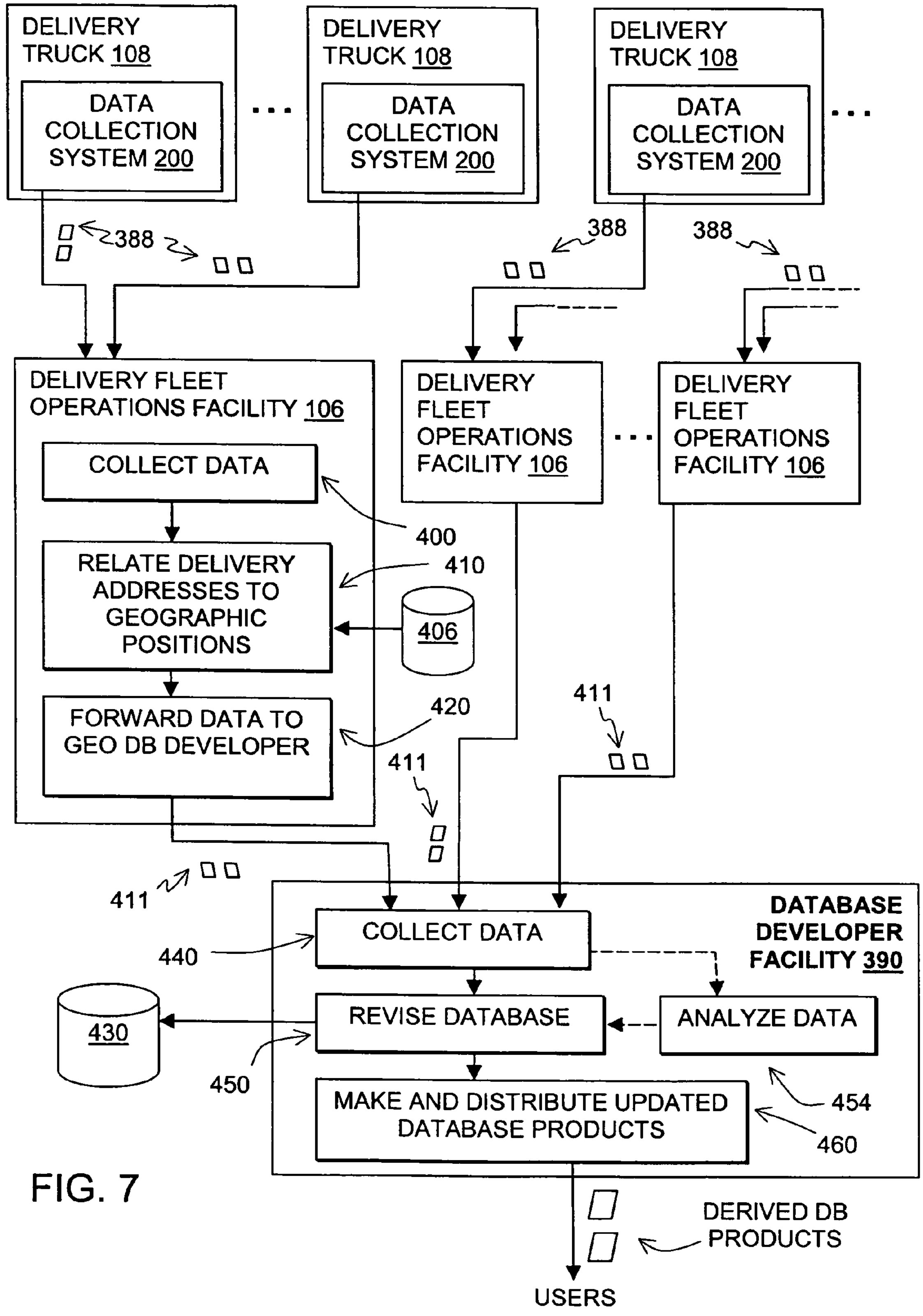
FIG. 7 is a flowchart showing additional steps in the process for collecting address location data using the embodiment of FIGS. 1–6.

Referring to FIG. 7, on a regular basis, the data 388 stored in each data collection system 200 in each of the delivery trucks are collected (Step 400). In one embodiment, the data are collected using a short-range wireless communications system (e.g., Bluetooth, IEEE 802.11, etc.) located at the facility 106 operated by the delivery truck fleet operator. This facility may be the location where items for delivery are loaded or where delivery trucks are serviced. According to this embodiment, when the delivery truck returns to the fleet facility 106, the data collection system 200 in the delivery truck enters into range of the short-range wireless communications system. When this occurs, the data collection system 200 in the delivery truck is automatically polled and the data 388 on the storage medium 220 of the data collection system 20 are transferred via the short-range wireless communications system to a nearby collection system located at the fleet facility. In one embodiment, the short-range wireless communications system has a relatively high bandwidth so that the transfer of data occurs relatively quickly. The collection system located at the fleet facility is implemented using a personal computer, a PDA, or similar device. Upon confirmation of a successful transfer of data from the data collection system 200 in the delivery truck, the data collection system 200 in the delivery truck erases the data in its own storage unit 220 thereby restoring its capacity to store data on a subsequent delivery trip.

The delivery fleet operator 106 possesses data 406 that associate the tracking codes with the delivery addresses. Using the data 406 that associate the tracking codes with the delivery addresses and the data 388 that associate delivery truck locations with the tracking codes, the delivery fleet operator 106 associates the delivery locations with corresponding delivery addressees (Step 410). This provides data 411 indicating a relationship between geographic coordinates and street addresses.

The data 411 relating the physical locations of deliveries and the corresponding street addresses are transferred to the database developer facility 390 (Step 420). These data 411 may be transferred as soon as the data are received from each delivery truck or alternatively, the data may be transferred at a later time. In one alternative, the data 388 collected from several delivery trucks may be accumulated and transferred together. Any suitable communications system may be used for the transfer of data from the fleet facility to the database developer facility 390.

The database developer facility 390 collects the data 411 from the various fleet facilities, including fleet facilities operated by different delivery companies (Step 440). The data indicating a relationship between geographic coordinates and street addresses are used to revise a geographic database 430 (Step 450).

Before revising the geographic database 430, the data indicating a relationship between geographic coordinates and street addresses can be used in several ways. According to one embodiment, various statistical analyses may be performed on the data that relate geographic coordinates and street addresses (Step 454). For example, over time there may be many deliveries of items to a particular street address. On some occasions, the delivery truck is able to park right outside the building at which the delivery is to be made whereas on other occasions, the delivery truck may park farther away. By observing a clustering of geographic locations associated with deliveries to a particular address over time, a relatively good determination of the actual geographic coordinates of the address can be determined.

Another type of analysis that can be performed uses data indicating the geographic coordinates of addresses that are close to each other. For example, by observing the geographic coordinates associated with various addresses along a road segment, locations of intersecting streets, no parking zones, etc., may be determined.

The data that relate geographic coordinates and street addresses may be used to revise a geographic database in various ways. For example, address location data may be stored as an attribute of a road segment data record in the geographic database 430. Alternatively, the data indicating a relationship between geographic coordinates and street addresses can be used to determine actual point addresses. According to this alternative, actual point addresses are stored in the geographic database. Actual point addresses indicate a position along a road segment between endpoints of the road segment. Alternatively, the position along a road segment may be represented or expressed by a fractional portion of percentage of the road segment length, e.g., n/256$^{th}$ of the road segment length from the northern endpoint. Using an embodiment of the disclosed system, actual point address data can be added to the database 430 that already has address range data.

The address data that are used to revise the geographic database 430 may be used to update existing data or to add new data. For example, the database 430 may already include address data or address ranges for a particular represented road segment. The new address data obtained using the process described in FIGS. 1–7 can be used to update the existing data, e.g., confirm the existing data or make the existing data more accurate. Alternatively, the geographic database may not include address data for a particular road segment. If new address data are obtained for a road segment that is represented by a data record that does not already include an address data attribute, the new address data can be added as a new attribute of the data record.

The geographic database that has been revised with the address data can be used to make derived database products (Step 460). The derived database products may include only portions of all the data in the database 430. For example, the derived database products may include data that relate to only one or more specific regions.

The derived database products may be used on various kinds of computing platforms. For example, the derived database products may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet.

The derived database products can be used in various applications. For example, the derived database products may be used in navigation-related applications such as applications provided in in-vehicle navigation systems. The navigation-related applications may include route calculation, route guidance, vehicle positioning, map display, and electronic yellow pages, as well as other kinds of functions. The derived database products may also be used for other types of applications, such as market research, demographic studies, censuses, and so on.

The derived database products may be in different specialized formats. The derived database products may be in formats that facilitate the uses of the derived products in the platforms in which they are installed. The derived database products may also be stored in a compressed format on the media on which they are located.

III. Further Alternatives

A. Alternative Methods for Determining the Positions of Delivery Trucks

In an embodiment described above, it was described that the location of a delivery truck at the time a delivery was being made was determined using a position determining system (such as GPS) located in the delivery truck. In an alternative embodiment, the positions of delivery trucks can be determined using a position determining system located outside the trucks. For example, the positions of delivery trucks can be determined by equipping each delivery truck with a cellular phone (which may already be incorporated in the long-range wireless communications system interface 172 in FIG. 3) and using a cellular phone location determining system. A cellular phone location determining system uses the locations of cell towers and other appropriate hardware and software to determine the positions of cellular phones located throughout a geographic area. There are various available technologies that can be used to determine the positions of cellular phones in an area. Some of these technologies use triangulation, time-of-arrival, and so on. Some of these technologies can be used to locate a cellular phone user who dials an emergency number, e.g., "911." The cellular phone location determining system may be part of the cellular phone system or may be a separate system.

When using a cellular phone location determining system to determine the position of a delivery truck when a delivery is being made, data indicating the location of the delivery truck may be transmitted from the cellular phone positioning system to the delivery truck and stored with data indicating the tracking code of the item being delivered in a data storage unit in the delivery truck.

In an alternative embodiment, data indicating the tracking code of an item being delivered and data indicating the time at which the delivery attempt is made are recorded by the delivery truck driver using the code reader or the docking station. Separately, the cellular phone location determining system determines the positions of the delivery truck as it is traveling a route making deliveries and the times the delivery truck is at the positions. Later, at the geographic database developer facility, the positions of the delivery truck are related to the tracking codes of the items being delivered using the corresponding time data.

According to another alternative, data indicating the tracking code of the item being delivered are transmitted to the cellular phone location determining system, matched with data that indicate the location of the delivery truck, and stored in a data storage device at the cellular phone location determining system.

B. Alternative Embodiments

Figure 8:
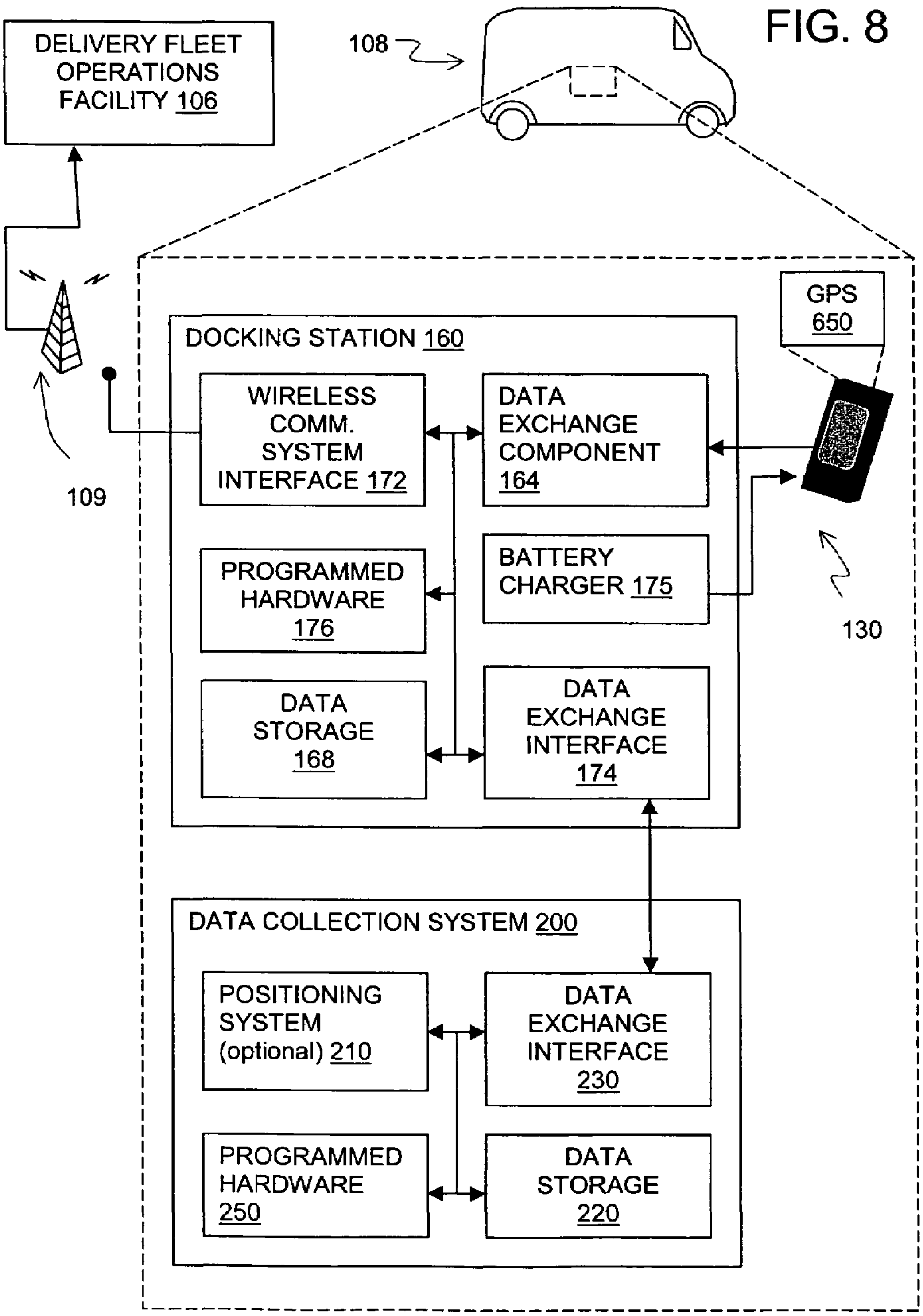
FIG. 8 is a block diagram showing components in one of the delivery trucks according to an alternative embodiment.

FIG. 8 illustrates an alternative embodiment. The embodiment in FIG. 8 includes some components that are similar to the embodiment described in FIGS. 1–7 and like components are referenced by like numerals. In the embodiment in FIG. 8, the code reader 130 carried by the delivery truck operator to the building at which the delivery attempt is made includes a positioning system 650. In this embodiment, the positioning system 650 in the code reader is a GPS system although other types of positioning systems may be used. In this embodiment, the code reader 130 stores data indicating the position of the code reader along with data indicating the tracking code and data indicating the delivery attempt result. The positioning system in the code reader may be a substitute for the positioning system in the data collection system in the delivery truck or alternatively, both the code reader and the data collection system may include positioning systems. If both the code reader and the data collection system in the delivery truck include positioning systems, the data collected by the positioning system in the code reader, if available, will take precedence over the data collected by the positioning system in the delivery truck. According to another alternative, if both the code reader and the data collection system include positioning systems, data can be collected that indicate both the actual location of an address (i.e., from the code reader) as well as a parking location for the address (i.e., from the data collection system located in the delivery truck). Both these types of data can be stored in the geographic database by the geographic database developer so that a person can be routed first to a parking location and then to an actual street address.

Figure 9:
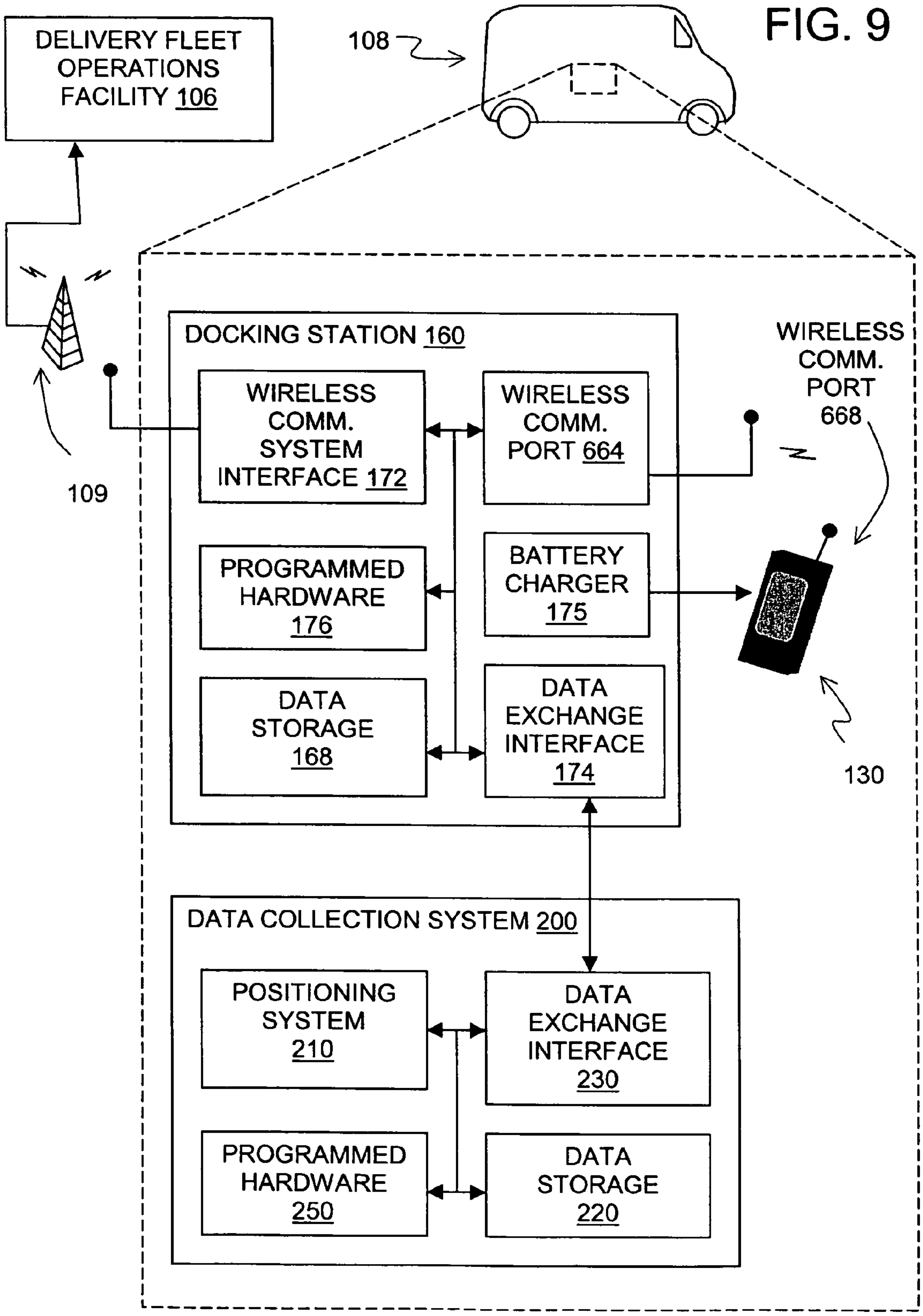
FIG. 9 is a block diagram showing components in another alternative embodiment.

FIG. 9 illustrates another alternative embodiment. The embodiment in FIG. 9 includes some components that are similar to the previous embodiments and like components are referenced by like numerals. In the embodiment in FIG. 9, the docking station 160 and the code reader 130 exchange data by means of a wireless communications system. In FIG. 9, the docking station 160 and the code reader 130 include compatible wireless data exchange ports 664 and 668. In one embodiment, the docking station 160 and the code reader 130 use a short-range wireless exchange technology, e.g., Bluetooth, IEEE 802.11, etc., although other technologies for wireless communications may be suitable. According to this embodiment, after the delivery attempt, the delivery truck operator returns to the delivery truck 108. When the delivery truck operator returns to the delivery truck 108, the data indicating the tracking code and the associated data indicating the delivery attempt result are wirelessly transferred from the code reader 130 to the docking station 160. The transfer of data may occur automatically as soon as the code reader 130 is carried within a given range (e.g., 20 meters) of the docking station 160. Alternatively, the delivery truck operator may initiate the transfer of data by appropriate manipulation of the user interface of either the code reader or docking station.

Figure 10:
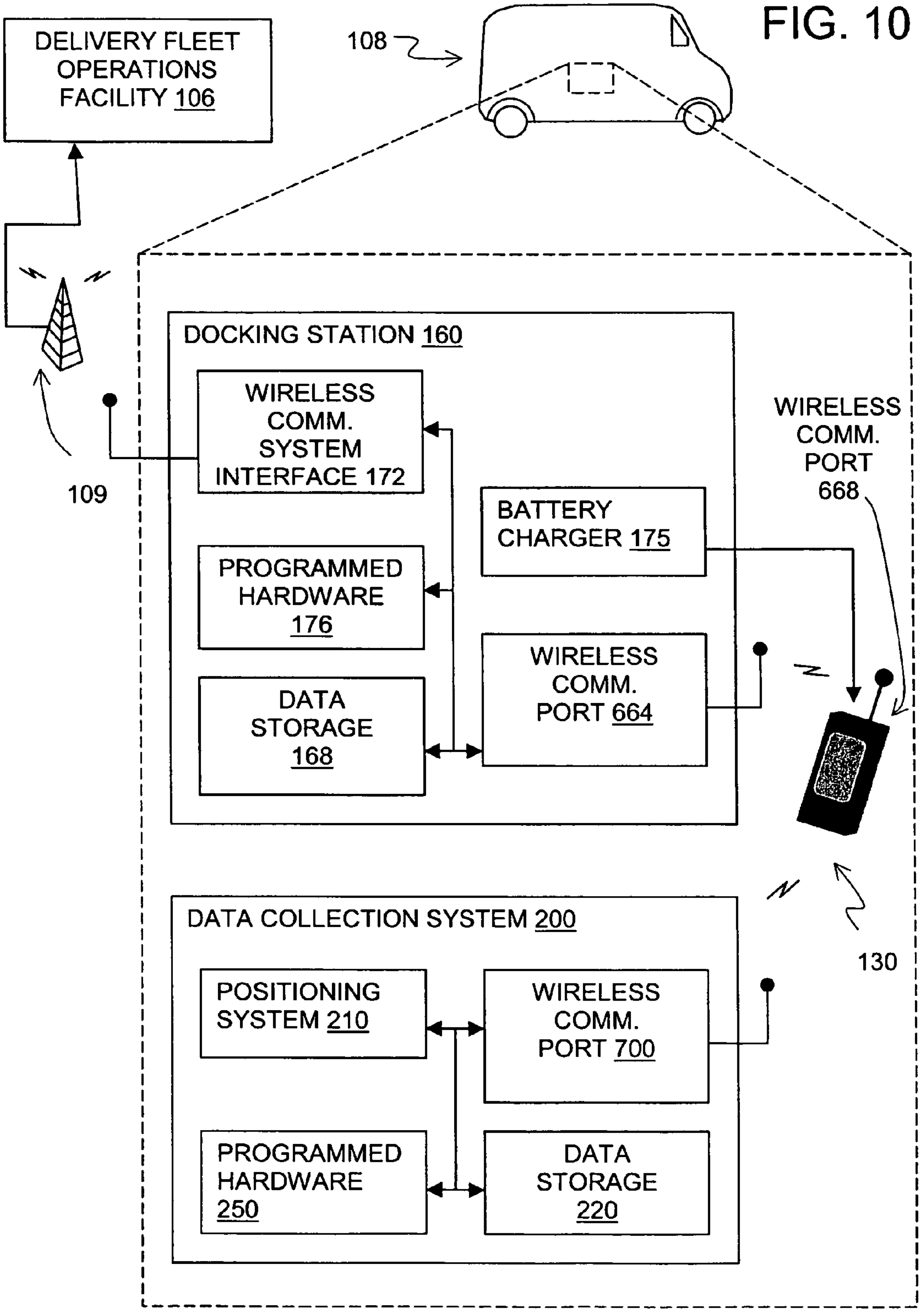
FIG. 10 is a block diagram showing components in still another alternative embodiment.

Another alternative is disclosed in FIG. 10 wherein like components are referenced by like numerals. In the embodiment of FIG. 10, the data collection system 200 includes a wireless data exchange port 700. The wireless data exchange port 700 in the data collection system 200 is similar to the wireless data exchange port 664 in the docking station 160 in FIG. 9. As in the embodiment of FIG. 9, the code reader 130 automatically transfers the data indicating the tracking code and the delivery attempt result to the docking station 160 when the delivery truck operator returns the code reader within wireless communications range of the delivery truck after having made a delivery attempt. In the embodiment of FIG. 10, the code reader also transfers the data indicating the tracking code and the delivery attempt result to the data collection system 200. In FIG. 10, the data collection system 200 and the docking station 160 are not necessarily connected together.

In one of the embodiments described above, the docking station and the data collection system in the delivery truck were described as separate devices or components. In an alternative embodiment, the functions of the docking station and the data collection system may be combined into a single component.

In another alternative embodiment, the functions of the docking station, the data collection system, and the code reader may be combined into a single component.

In the embodiment described in connection with FIG. 7, it was stated that the data from the data collection system in each truck are transmitted from the delivery truck when the delivery truck returns to the fleet facility. There are various alternative ways to transfer these data. According to one alternative embodiment, the data storage media in the data collection system in each delivery truck may be physically removed regularly and replaced with blank storage media. The fleet operator then copies the data from the storage media that had been removed from the delivery trucks, uses the tracking codes to relate the physical locations to street addresses, and forwards the related physical locations and street addresses to the database developer. Alternatively, the data relating the delivery truck locations and the tracking codes can be transmitted from the delivery trucks to the fleet operator using a wireless communication system, such as cellular telephone.

In the process described in connection with FIG. 7, it was stated that the database developer obtained from the delivery fleet operator data that related the tracking codes of items with the respective addresses to which the items were to be delivered. The database developer then used the tracking codes to relate the delivery addresses to the collected data that indicate the physical locations associated with the deliveries. In an alternative embodiment, the step of relating the delivery addresses to the collected data that indicate the physical locations associated with the deliveries can be performed by the delivery fleet operator. According to this alternative, the delivery fleet operator then provides the matched addresses and physical locations to the geographic database developer who uses the information to revise its geographic database.

In some of the embodiments disclosed above, it was described that data associating the tracking codes with the delivery addresses were obtained as part of the process of developing data that associated the delivery locations with the delivery addresses. In an alternative embodiment, data indicating the tracking code for an item to be delivered can include data that indicate the delivery address. If the tracking code for an item includes data that indicate the delivery address for that item, then the delivery address can be extracted directly from the tracking code and associated with the delivery location.

In the above embodiments, it was described how data that indicate the physical location of an item being delivered can be collected and then related to an address associated with the item being delivered by means of the tracking code affixed to the item. In alternative embodiments, other information associated with the addressee can be related to the physical location of a delivery. This other information can include information other than a street address. For example, this other information can include vanity addresses, building or location names, business names, individual person names, facility names, administrative names, etc. These other types of information can be related to a physical location directly or indirectly by means of the tracking code associated with an item being delivered.

In the above embodiments, it was described how data that indicate the physical locations associated with attempted deliveries of items can be collected and then related to the respective street addresses associated with the locations to which attempts to deliver the items were made. According to another embodiment, pick ups of items for deliveries can also be used to associate physical locations with street addresses. According to this alternative embodiment, some delivery services use trucks to pick up items that people want delivered. These items being picked up can be handled in a similar manner as items being delivered. The physical location associated with an item being picked up can be obtained using a data collection system in the delivery truck, as described above. The street address information associated with an item being picked up can be stored and associated with the tracking code affixed to the item. The tracking code can then be used to relate the physical location of the item that was picked up with the street address.

In an alternative embodiment, the code reader also records the time at which a delivery attempt is made (i.e., a time stamp) and associates the data indicating the time at which a delivery attempt is made with the data that indicate the delivery attempt result and/or the tracking code associated with an item. In this embodiment, the data indicating the time of a delivery attempt are also transferred from the code reader to the tracking station and/or the data collection system in the delivery truck. According to a further alternative version of this embodiment, the data collection system stores data that indicates the time at which each position of the delivery truck was determined and/or at which an attempt to delivery an item was made. These data indicating the times of delivery attempts and delivery locations can be used to help relate the addresses to which items are delivered with the locations to which the deliveries were made. These data can also be used for other purposes, such as determining the rates of vehicular travel along roads, identifying locations of traffic congestion, and so on.

IV. Advantages

The disclosed embodiments provide for collecting geographic data efficiently and quickly. More particularly, the disclosed embodiments provide for collecting geographic data using an existing infrastructure that covers all roads. The disclosed embodiments are particularly useful for collecting address location data for rural and suburban areas.

Some of the embodiments described above use short-range communications systems to transmit data from the data collection system in the truck to a system at the fleet operator's facility or from the code reader to a storage unit in the delivery truck. This feature provides the advantage that wireless connection charges are reduced or eliminated.

It is intended that the foregoing detailed description be regarded as illustrative rather than limiting and that it is understood that the following claims including all equivalents are intended to define the scope of the invention.

We claim:

1. A method of collecting data for a geographic database comprising the steps of:
- collecting data while making deliveries of items to locations of addresses in a geographic area, wherein said step of collecting data includes:
  - making deliveries of the items to the locations of addresses in the geographic area;
  - using positioning equipment to determine a geographic position associated with each delivery; and
  - storing data by which the geographic position associated with each delivery is related to an address associated with the item being delivered; and
- revising the geographic database based on a relationship between the geographic positions associated with the deliveries and the addresses associated with the items being delivered.

2. The method of claim 1 further comprising:
- using a portable code recording device to record a code associated with an item being delivered, wherein the code associated with an item is related to the address to which the item is to be delivered; and
- using the code to relate the address to which an item is delivered to the geographic position associated with the delivery.

3. The method of claim 2 wherein the code is affixed to the item being delivered.

4. The method of claim 1 wherein the step of making deliveries is performed by a delivery company and the step of revising the geographic database is performed by a geographic database developer.

5. The method of claim 1 wherein the step of making deliveries is performed using delivery trucks.

6. The method of claim 1 wherein the step of revising includes updating address ranges associated with road segments represented in the geographic database.

7. The method of claim 1 wherein the step of revising includes associating geographic coordinates with addresses to provide improved estimates of address locations.

8. The method of claim 1 further comprising:
- prior to the step of revising, performing statistical analysis on data representing multiple deliveries of items to the same address.

9. A method of collecting data for a geographic database comprising the steps of:
- collecting data while making deliveries of items to locations in a geographic area, wherein the locations are associated with identifying information, wherein said step of collecting data includes:
  - making deliveries of the items to the locations in the geographic area;
  - using positioning equipment to determine a geographic position associated with each delivery; and
  - storing data by which the geographic position associated with each delivery is related to the identifying information associated with the location to which the item is being delivered; and
- revising the geographic database based on a relationship between the geographic positions associated with the deliveries and the identifying information associated with the locations to which the items are delivered.

10. The method of claim 9 wherein the identifying information includes at least one of vanity addresses, building or location names, business names, individual person names, facility names, and administrative names.

11. The method of claim 9 further comprising:
- using a portable code recording device to record a code associated with an item being delivered, wherein the code associated with an item is related to the identifying information associated with the location to which the item is delivered; and
- using the code to relate the identifying information associated with the location to which an item is delivered to the geographic position associated with the delivery.

12. The method of claim 11 wherein the code is affixed to the item being delivered.

13. The method of claim 9 wherein the step of making deliveries is performed by a delivery company and the step of revising the geographic database is performed by a geographic database developer.

14. The method of claim 9 wherein the positioning equipment is associated with a delivery truck used to make the deliveries.

15. The method of claim 9 wherein the step of revising includes associating geographic coordinates with the identifying information.

16. The method of claim 9 further comprising:
- prior to the step of revising, performing statistical analysis on data representing multiple deliveries of items to the same location.

17. A method of collecting data for a geographic database comprising the steps of:
- collecting data while making deliveries of items to locations of addresses in a geographic area, wherein said step of collecting data includes:
  - making deliveries of items to the locations of addresses in the geographic area;
  - using positioning equipment to determine a geographic position associated with each delivery; and
  - storing data by which the geographic position associated with each delivery is related to an address associated with the item being delivered; and providing the collected data to a geographic database developer for revising the geographic database based on a relationship between the geographic positions associated with the deliveries and the addresses associated with the items being delivered.

18. A method of revising a geographic database comprising the steps of:

obtaining data collected by a delivery company, wherein the delivery company collects the data while making deliveries of items to locations of addresses in a geographic area, wherein the delivery company uses positioning equipment to determine a geographic position associated with each delivery and stores data by which the geographic position associated with each delivery is related to an address associated with the item being delivered; and revising the geographic database based on a relationship between the geographic positions associated with the deliveries and the addresses associated with the items being delivered.

19. A method of revising a geographic database comprising the steps of:

obtaining data collected by a delivery company, wherein the delivery company collects the data while making deliveries of items to locations in a geographic area, wherein the delivery company uses positioning equipment to determine a geographic position associated with each delivery and stores data by which the geographic position associated with each delivery is related to identifying information associated with the item being delivered; and revising the geographic database based on a relationship between the geographic positions associated with the deliveries and the identifying information associated with the items being delivered.

20. The method of claim 19 wherein the identifying information includes at least one of vanity addresses, building or location names, business names, individual person names, facility names, and administrative names.

* * * * *